(12) United States Patent
Nunes

(10) Patent No.: US 7,552,156 B2
(45) Date of Patent: Jun. 23, 2009

(54) RANDOM NUMBER GENERATOR

(76) Inventor: Ryan J. Nunes, 8007 Spring Rd., Cabin John, MD (US) 20818

( * ) Notice: Subject to any disclaimer, the term of this patent is extended or adjusted under 35 U.S.C. 154(b) by 578 days.

(21) Appl. No.: 10/928,182

(22) Filed: Aug. 30, 2004

(65) Prior Publication Data

US 2006/0047735 A1   Mar. 2, 2006

(51) Int. Cl.
*G06F 1/02* (2006.01)
(52) U.S. Cl. .................................... 708/250
(58) Field of Classification Search .......... 708/250–256
See application file for complete search history.

(56) References Cited

U.S. PATENT DOCUMENTS 3,703,727 A * 11/1972 Knowlton .................. 708/250
5,983,252 A * 11/1999 Clapp ...................... 708/250
6,735,606 B2 * 5/2004 Terasawa et al. ............ 708/256
7,016,925 B2 * 3/2006 Schmidt .................... 708/250
7,149,240 B2 * 12/2006 McDonough et al. ....... 708/250
2003/0016823 A1 * 1/2003 Chung ....................... 380/46

* cited by examiner

*Primary Examiner*—Chat C Do
(74) *Attorney, Agent, or Firm*—Buchanan Ingersoll & Rooney PC

(57) ABSTRACT

A pseudo-random number generator employs a value in an existing sequence of numbers as an index into a table of irrational numbers. The value that is retrieved from the table is used to derive another value that is combined with multiple other values in the sequence to generate the next number in the sequence. The resulting values are shown to be more random than those generated by other known generators.

9 Claims, 1 Drawing Sheet

RANDOM NUMBER GENERATOR

FIELD OF THE INVENTION

The present invention is directed to the generation of pseudo-random number sequences, and more particularly to a random number generator that generates number sequences exhibiting a greater degree of randomness than other generators currently known in the state of the art.

BACKGROUND OF THE INVENTION

Pseudo-random number generators are employed worldwide in a number of applications. The most prominent uses are sampling and cryptography. Although the most well-known generators produce apparently random numbers, at some point the numbers form a constant pattern, making them only pseudo-random, or random up to a certain point.

There are several types of pseudo-random number generators that have been accepted by the mathematics community as being valid. Modular mathematics is used to restrict the range of the pseudo-random numbers produced. This disclosure contains examples in which various pseudo-random number generators are evaluated using modulo(10) and modulo(1000). Modular numbers generated at these low order (i.e. 1- and 3-digit numbers) can be analyzed more easily, to thereby facilitate an understanding of the principles underlying the invention.

One known pseudo-random number generator is the Linear Congruential. The formula for the Linear Congruential generator is $X_{n+1}=A*X_n+C$ [mod 1000]. This formula takes the previous number generated, $X_n$, multiplies it by a seed A, and adds a constant C.

A second pseudo-random number generator is the Additive Congruential (also known as the Fibonacci or Lagged Fibonacci Number Generator.) The formula for the Additive Congruential generator is $X_{n+1}=X_{n-s}+X_{n-r}$[mod 1000]. This formula requires two seed keys, S and R. This formula works by adding a number S spaces back to a number R spaces back in the series of numbers generated. Closely related is the Subtractive Congruential, which is essentially the same as the Additive Congruential, except the numbers are subtracted rather than added, as can be seen in the formula $X_{n+1}=X_{n-s}-X_{n-r}$ [mod 1000].

The Simple Shift Register generator has the formula $X_{n+1}=(X_{n-1}* C_{irr})$ [mod 1000] where $C_{irr}$ is a constant irrational number, such as pi, 2½, etc. The random numbers are selected from a point in the irrational number (i.e. one or more digits are extracted) and each number is multiplied again by the irrational number to produce a new variation.

The Generalized Feedback Shift Register has the formula of $X_{n+1}=X_{nq}+X_{nr}+1$ [mod 1000]. Both q and r are constant exponents.

There are other kinds of pseudo-random number generators that are based on physical systems, rather than pure number theory. One example of such is the Tausworth, which is a pseudo-random number generator based on the internal electronic operations of a computer and require real-time active measurement. Another method measures uranium decay and counts electrons as a random measure.

There are many tests which can be devised to test the randomness of a pseudo-random number generator. Some of these tests, which are discussed in detail hereinafter, include mean, median, standard deviation, coefficient of correlation, and slope. However, it is to be noted that there is no true test for randomness that is definitive in pseudo-random number generators. Even processes and numbers thought to be random in nature are now being found in some cases to match the Chaos Theory, which shows some regularity after enough investigation and analysis.

Each of the known pseudo-random generators described above was tested for randomness, using the procedure described at the end of this disclosure. The following tests were applied to the results of each generator:

Repetition: Determining where, i.e. after how many numbers, a pattern began and the period (length before repeating) of that pattern.

Average: Arithmetic average (Mean) of all the numbers output from the generator. In theory, an average should equal the midpoint of the possible range if the numbers are random.

Median: The middle number in the set of data, which, ideally, is the middle number of the range.

Standard Deviation: The amount by which the output varies on average from the mean. If a set were truly random, then the standard deviation should be at the quartile points.

Coefficient of Correlation: This tests for a correlation (sequence) within the number output. If the number were truly random, there would be no correlation and the coefficient of correlation would be zero.

Slope: This is very similar to the coefficient of correlation since, ideally, the slope is zero if there is no relationship between the output numbers.

Using these particular tests, the randomness of each generator can be determined with some certainty. Although there are many other, more complicated, tests, if a generator fails these tests, it can be concluded that it is not producing random numbers for any extended period. The generators were tested first with a modulo(10) implementation.

The Linear Congruential Rational Generator produced unsatisfactory results on every attempt. All of the generators performed poorly and repeated quickly with a very short period. Although they performed poorly, there is no true test for randomness, and that is proven in this example as the average of the generators was 4.58, the median was 4.5, the standard deviation was 2.08 (where 2.5 is the ideal standard deviation), both the coefficient of correlation and the slope had an average near zero. More particularly, looking at only the averages of these tests, the generators appear to be pretty random. However, looking at the repetition in the outputs, the lack of randomness is immediately apparent.

The Linear Congruential Irrational generator is virtually identical to the Linear Congruential Rational generator in repetition and period. However, the averages of the tests are less convincingly random. This is an even less satisfactory generator.

The Simple Fibonacci generator is better than either of the Congruential generators. However, it too repeated, though with a much longer period than either of the Congruential generators. The tests indicated a fair degree of randomness. The average was 4.67, the median was 4.74, the standard deviation was 2.87, and both the coefficient of correlation and the slope were near zero. Nevertheless, the generator exhibits repetition in its output results.

The Simple Shift Register generator produced the worst results. The generator repeated immediately with the smallest possible period. However, some of the tests appeared to show some randomness, which is deceiving. For example, the average and the median were 2.6. If one looked at the coefficient of correlation, which was 0.4227, and the slope, which was 0.4052, without knowing about the immediate repetition, one might be deceived to think there is some randomness.

The Generalized Feedback Shift Register generator did not repeat immediately. However, the generator would normally fall into a repeating pattern when it hit a particular number, most often zero. The pattern was: "3, 2, 4, 1, 9, 7, 5". The tests, for the most part, gave the impression that the generator is random, but looking at the data on repetition, it is apparent that the generator is not truly random.

The generally poor results produced by these generators reveal their unreliability. It is possible that these generators might have produced more random output digits had the constants in the formulas been different. However, if the choice of seed number(s) or constant(s) can adversely affect an entire run of generators, these generators are unsatisfactory to begin with. If one has to be careful about choosing constants and seeds, then it is clear that the generator is not reliable and another alternative should be found.

Since the generators, for the most part, appeared to repeat fairly quickly, they were also tested in modulo(1000) to give the generators a chance to run with a higher number of possible output digits. That higher number would also help to test whether the modulo choice (i.e. the range of possible outputs) could affect randomness in comparison to the choice of seeds. To test modulo(1000) with a relatively high statistical confidence, each generator run was taken out to at least the $2276^{th}$ pseudo-random number.

The Linear Congruential Rational Generator was practically the same in modulo(1000), repeating, on average, at the 97.87, or the $98^{th}$ number. However, once again, the other tests gave the false impression that the generator is truly random. The fact that the generators repeated around the $98^{th}$ number indicates that only 10% of the population was exhausted before the generator fell into a repeating pattern.

The Linear Congruential Irrational generator is even worse than the Linear Congruential Rational generator, repeating, on average, after the 49.833, or $50^{th}$ number. Thus, only 5% of the population was exhausted before the generator fell into a repeating pattern.

The Simple Fibonacci generator is the best of the tested generators, repeating, on average, after the 1058.63, or the $1059^{th}$ number. This means that, theoretically, all of the numbers in the population were exhausted through one cycle before the generator started to repeat. Nevertheless, the generator still repeated, so its reliability is again limited to shorter runs.

The Simple Shift Register generator was, once again, shown to be a fairly non-random generator, repeating, on average, after the $80.75^{th}$ number, or the $81^{st}$ number. Although some of the other tests gave the impression that the generator is random, the generator still repeated at a relatively early point in each run.

The Generalized Feedback Shift Register is second best of the tested generators, repeating, on average, after the $984.40^{th}$ number, or the $984^{th}$ number. Most of the statistics for this generator gave the impression that the generator is fairly random; however, it too repeated.

SUMMARY OF THE INVENTION

The present invention comprises a pseudo-random number generator that produces results that are more random than those generated by the known generators described above. In general, the pseudo-random number generator of the present invention employs a value in an existing sequence of numbers as an index into a table of irrational numbers. The value that is retrieved from the table is combined with multiple other values in the sequence to generate the next number in the sequence.

DETAILED DESCRIPTION

Figures 1, 2:
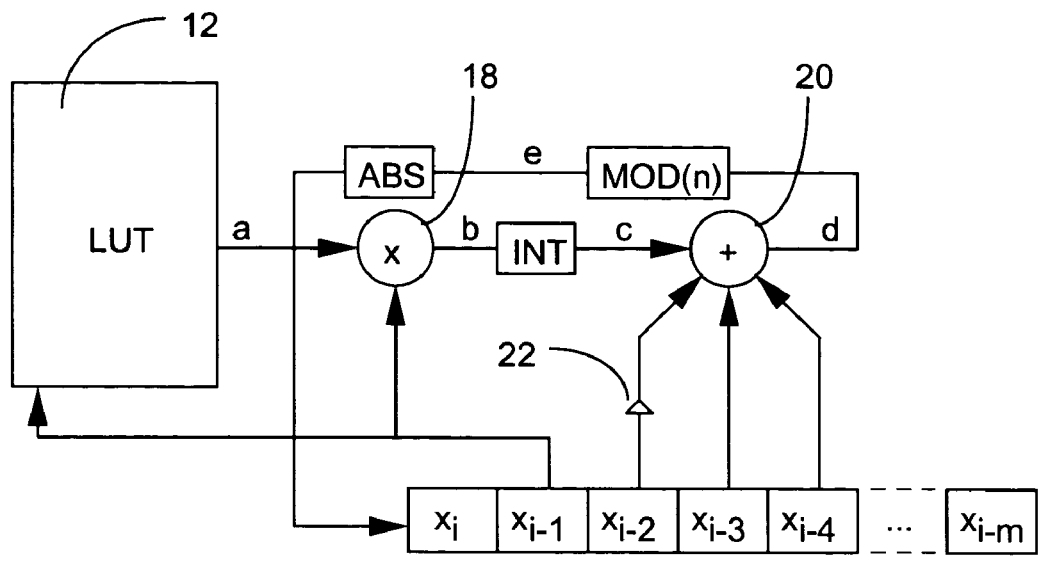
FIG. 1 is a conceptual block diagram of one embodiment of the invention.
FIG. 2 is an example of a table of irrational numbers.

In general, the pseudo-random number generator of the present invention generates a sequence of values $X_0, X_1, X_2 \ldots X_n$, in which each value $X_i$ in the sequence is determined on the basis of preceding values $X_{i-1}, X_{i-2}$, etc. in the sequence, as well as a table of irrational numbers. The initial values in the sequence comprise arbitrarily selected seed values. An exemplary embodiment of the pseudo-random number generator of the present invention is described hereinafter in which each new value is determined on the basis of the four preceding values in the sequence. Hence, $X_0$-$X_3$ are seed values. This embodiment can be expressed mathematically as the following series of steps, where $X_i$ is the next number in the sequence to be generated:

1. $a=TLU(X_{i-1})$, where $TLU(j)$ is a table look-up operation using the index j
2. $b=a*X_{i-1}$
3. $c=INT(b)$, where $INT(j)$ is the nearest integer to j
4. $d=c+X_{i-4}+X_{i-3}-X_{i-2}$
5. $e=MOD_{10}(d)$, where $MOD_{10}(j)$ is the value of j modulo (10)
6. $X_i=ABS(e)$, where $ABS(j)$ is the absolute value of j The operation of this embodiment is conceptually depicted in the block diagram of FIG. 1. The sequence of random numbers is stored in a register 10. The next number in the sequence, $X_i$, is generated by first selecting a value from an indexed table 12 of irrational numbers. One example of such a table is shown in FIG. 2. The table comprises a sequential list of indices 14, and an associated irrational number 16 for each index. In the illustrated example, the first irrational number is the value $\pi$, and the remaining irrational numbers comprise the square roots of the first nine prime numbers, respectively. It will be appreciated that any other set of irrational numbers can be used in the table 12. The most recent number in the random number sequence, i.e. $X_{i-1}$, is employed as the index to the table, to select the irrational value to be used for the new number.

The selected irrational number, a, is applied as one input to a multiplier 18. Another input to the multiplier comprises a number in the stored sequence, in this case $X_{i-1}$. The product of these two numbers, b, is another irrational number, which is converted to an integer value, c. The conversion to an integer value can be accomplished by rounding b up or down to the nearest whole number, or by simply truncating b to delete the fractional portion.

The resulting integer value c is then algebraically combined with other values in the sequence, in an adder 20. In the example of FIG. 1, the values for $X_{i-4}$ and $X_{i-3}$ are added to c, and the value for $X_{i-2}$ is subtracted from the result, i.e. the sign of $X_{i-2}$ is switched from positive to negative, as represented by the polarity inverter 22, and this value is added in the adder 20.

In the next step, the algebraic sum d is converted to modulo (n), to produce a result e that is within the designated range for the sequence of random numbers. In the present example, it is possible that the values d and e could be negative values, if $X_{i-2}$ is greater than the sum of $c+X_{i-4}+X_{i-3}$. As a final step, therefore, the absolute value of e is determined. This result is then stored in the register as the next random number $X_i$ in the sequence.

There are a number of ways in which the foregoing process can be implemented. For instance, a hard-wired circuit containing components that correspond to those depicted in FIG. 1 can be employed. Alternatively, some or all of the operations can be performed in software. In this regard, a spreadsheet program, such as Microsoft Excel®, can be used to perform the operations and store the resulting sequence. An embodiment of the present invention is described hereinafter in which a pseudo-random sequence of single-digit numbers is generated with such a program. For this example, therefore, a table of 10 irrational numbers is employed for the generator.

1) Table Setup
  1A: In column A, rows 1-10, the numbers 1 through 9 and 0 are inserted;
  1B: The following formulas are inserted in the corresponding cells of column B:

B1:=PI( )

B2:=SQRT(2)

B3:=SQRT(3)

B4:=SQRT(5)

B5:=SQRT(7)

B6:=SQRT(11)

B7:=SQRT(13)

B8:=SQRT(17)

B9:=SQRT(19)

B10:=SQRT(23)

These steps create a table where the column B cell values can be looked up through the column A cell values 0 through 9.

2) Algorithm Seeds: The generator of the exemplary embodiment uses four seeds, and so for a single digit test, there are 10,000 possible combinations (the numbers 0000 through 9999). To obtain seed values, a ten-sided die can be rolled 4 times, to generate a set of 4 numbers. These appear as the first four numbers in the output sequence, and are entered in the cells A14 to D14.

3) Run-Time Process: The generator is now run:
  3A: In E14, the following formula is entered:

=IF (D14=0, MOD(ABS(A14+B14−C14), 10),AB-
       SMOD( ROUND(VLOOKUP(D14, $A$1:$B$10,
       2,TRUE)*D14,0)+A14+B14−C14,10)))

This formula takes the absolute modulo(10) value of the addition of the cells 3 and 4 rows back and subtracts from that result the cell 2 rows back. Then it looks in the table created above for the number in the A column corresponding to the last digit of the number in the immediately preceding cell and adds the 4+3−2 result by the corresponding irrational number, rounded to the nearest integer value and calculated under modulo(10). For example, if the preceding four cells contain the values 5, 5, 3 and 2, the table returns the square root of 3 as the irrational multiple (based on 2 in the adjoining cell), to be multiplied by the result of 5+5−3 (i.e. 7) with the result of 7 times the square root of 3, rounded to the nearest integer and calculated to modulo(10). The absolute value is used in case the subtraction is greater than the sum of the two preceding numbers (e.g. 2,3,8 yielding 2+3−8=−5, or absolute value 5).

3B: The formula in cell E14 is copied to cells F14 through cell BD14. Then cells E14 through BD14 are copied to E15 through BD19.
  3C: The formula is adjusted in the next line's first four places in order to account for the places held by the manually determined seeds in the first line, as follows:
   In cell A15, the following formula is entered:

IF(BD14=0,MOD(ABS(BA14+BB14−BC14),10),ABS
       (MOD(ROUND(VLOOKUP(BD14, $A$1:
       $B$10,2,TRUE)*BD14,0)+BA14+BB14−BC14,
       10)))

In cell B15, the following formula is entered:

IF(A15=0,MOD(ABS(BB14+BC14−BD14),10),ABS
       (MOD(ROUND(VLOOKUP(A15,$A$1:$B$10,2,
       TRUE)*A15,0)+BB14+BC14−BD14,10)))

In cell C15, the following formula is entered:

IF(B15=0,MOD(ABS(BC14+BD14−A15),10),ABS
       (MOD(ROUND(VLOOKUP(B15, $A$1:$B$10,
       2,TRUE)*B15,0)+BC14+BD14−A15,10)))

In cell D15, the following formula is entered:

IF(C15=0,MOD(ABS(BD14+A15−B1314),10), ABS
       (MOD(ROUND(VLOOKUP(C15,$A$1:$B$10,2,
       TRUE)*C15,0)+BD14+A15−B15,10)))

3D: Cells A15 through D15 are copied to A16 through D19. This creates the sequence, comprising 336 random numbers (6 rows each having 56 values therein).

When the generator of the present invention was tested in the same manner as the known generators, as described previously, the results reveal that it is most random of all of the generators tested. For the most part, the generator of the present invention made it through all of the numbers in the sample without repeating. Out of 100 samples run in modulo (10), only 10 of those samples repeated at some point. It is important to note that the sample size could have been greater and that it might have repeated at some point, however, the sample size tested was statistically valid, showing that the generator seems to be fairly reliable at least for relatively short test runs for single digit random numbers. The worst run repeated after 20 output digits and had a period of 19 output digits. The seeds for this particular run were "1, 4, 5, 4". Thus, even with a reliable generator, an unfortunate choice of seeds can affect the reliability of the results. The test results, however, appeared to be anomalous because they had more of a slope and a higher coefficient of correlation than some of the other generators. Nonetheless, they did not repeat nearly as often.

The generator of the present invention never repeated within the sample size in any of the tests run in modulo(1000), showing that it is clearly superior to the other generators that were tested. The tests, for the most part, showed that the generator of the present invention exhibited randomness. Even when the sample size was expanded, the generator was found to repeat at much later numbers than any of the known generators described previously.

Testing Procedure
  The following procedure describes an implementation of a randomness test using a spreadsheet program, such as Microsoft Excel®. To generate random seed values for the generators, a 10-sided die is employed for embodiments requiring a single seed value, and a combination of the 10-sided die and a 20-sided die is employed for embodiments requiring multiple seed values.
1. Sample Size: This procedure uses a sample size with a 99% confidence level and a 7.08% confidence interval for Modulo(10) numbers and a 99.5% confidence level and 2.7% confidence interval for numbers tested in Modulo (1000). To calculate the sample size needed, a sample size calculator such as the one published by Creative Research Systems at http://www.surveysystem.com/sscalc/htm can be used. Modulo(10) can be selected for the simplest random evaluations, the digits 0 through 9, while for a more complex look at the subject, Modulo(1000), i.e. values 000 to 999, can be used.

2. Template: The first step is to make a template:
   2A: In cell A3, insert the label "SEEDS".
   2B: Enter the following test names in the corresponding cells shown:
   V5=Average
   AB5=Median
   AH5=StdDev
   AN5=Correl
   AT5=Slope
   2C: Enter the following test formulas in the corresponding cells:
   Z5=AVERAGE(A6:BD11)
   AF5=MEDIAN(A6:BD11)
   AK5=STDEV(A6:BD11)
   AQ5=CORREL(A6:BD11,'C:\[Seq2.xls]Sheet1'!$A$10:$BD$15) where "C:" designates the storage medium on which the files will be saved;
   AW5=SLOPE(A6:BD11,'C:\[Seq2.xls]Sheet1'!$A$10:$BD$15).

3. Create Sequential File: To calculate Slope and the Coefficient of Correlation a separate file with the numbers in sequential order is utilized.
   3A: In cell A1 type in the name of the file, e.g. "SEQUENTIAL".
   3B: In cell A2 enter the number 1.
   3C: In cell B2, enter the formula:=MOD(1+A2, 10)
   3D: Copy the formula from cell B2 to cells C2 to BD2.
   3E: In cell A3, enter the formula =MOD(1+BD2, 10)
   3F: Copy cells B2 to BD2 to cells B3 to BD3
   3G: Copy cells A3 to BD3 down to row 7.

4. Linear Congruential Rational Generator: A formula for a random number generator is then entered into the spreadsheet. The easiest generator to produce is the Linear Congruential because it requires only one seed. Using a Rational number in the formula is the simpler form so Linear Congruential Rational was tested first.
   4A: Using the template created in step 2 above, enter the label "Seeds 0 to 9 & Feed" in cell A3 and the number 0 in cell I3. The number 0 in cell I3 is used as a constant in the formula.
   4B: In cell A6 enter the number 0. In cell B6, enter the following formula:

=MOD((2*$A6$)+$I$3,10)

4C: Copy the formula in cell B6 through cell BD6.
   4D: In cell A7, enter the following formula:

=MOD((2*BD6)+$I$3,10)

4E: Copy cells A7 through BD7 down to row 11 on the spreadsheet.
   4F: In cell A12, enter the label "Linear Congruential Rational", and repeat the same actions as steps 4B-4E, changing the formulas to correspond with the correct cells, and making the runs 6 rows long and 56 columns wide (out to column BD). Repeat this process using the seeds 0 through 9. The generator has now been created.
   4G: Save the generator with a suitable name, e.g. LC10.xls.
   4H: Change the value in cell I3 to 1 and save the generator as another file, e.g. LC11.xls, and repeat this step, changing I3 from 2 to 9 each time and saving the file with a corresponding name.

5. Linear Congruential Irrational: To produce the Linear Congruential Irrational generator, the following steps are followed.
   5A: Open the template created in step 2, and in cell A2 enter the label "Linear Congruential Irrational". In cell A3, enter the label "Seeds 0 to 9".
   5B: In cell A6 enter the number 0. In cell B6, enter the following formula:

=MOD(TRUNC((PI( )*A6)+(SQRT(2))), 10)

5C: Copy the formula from cell 5B through cell BD6.
   5D: In cell A7, enter the following formula:

=MOD(TRUNC((PI( )*BD6)+(SQRT(2))),10)

5E: Copy cells A7 through BD7 down to row 11.
   5F: In cell A12, enter the label "Linear Congruential Irrational" and repeat the process of Step 4F, using the Irrational formula and changing the formulas to correspond with the correct cells, making the runs 6 rows long and 56 columns wide (out to BD).
   5G: Repeat this process using the seeds 0 through 9. The generator has now been created.
   5H: Save the generator with an appropriate name, such as LCI10.xls.

6. Simple Shift Register: The following steps implement the Simple Shift Register in Modulo(10):
   6A: Open the template created in Step 2, and in cell A2 enter the label "Simple Shift Register". In cell A3 enter the label "Seeds 0 to 9".
   6B: In cell A6 enter the number 0, and in cell B6, enter the following formula:

=VALUE(MID(SQRT(2)*A6,10,1))

6C: Copy the formula from cell B6 through cell BD6.
   6D: In cell A7, enter the following formula:

=VALUE(MID(SQRT(2)*BD6,10,1))

6E: Copy cells A7 through BD7 down to row 11.
   6F: In cell A12, enter the label "Simple Shift Register", again repeating the Step 4F process, but using the Simple Shift Register formula and changing the formulas to correspond with the correct cells, making the runs 6 rows long and 56 columns wide (out to BD).
   6G: Repeat this process using the seeds 0 through 9. The generator has now been created.
   6H: Save the generator with an appropriate name, such as SSH0to9.xls.

7. Generalized Feedback Shift Register:
   7A: Open the template created in Step 2 and enter the label "Generalized Feedback Shift Register" in cells A2, A5, A12, A19 and in column A of every seven rows down to A68. In cell A3 enter the label "Seeds"and in cell D3 enter 0. In cell F3 enter "& 0 to 9".
   7B: In cell A6 enter the formula =$d$3 and in cell B6 enter 0.
   7C: Enter the following formula in cell C2:

=TRUNC(MOD(((A6(SQRT(2)))+(B6PI( ))+1),10))

This formula takes the cell two cells back to the power of the square root of 2, and adds that result to the prior cell at the power of π, adds 1 to the result (in case the result was 0), truncates off the decimal portion and calculates modulo(10) for the remaining integer.

7D: Copy the formula from cell C2 through cell BD6. Copy from cells C6 to BD6 down to C11 to BD11.

7E: In cell A7, enter the formula:

=TRUNC(MOD((($BC6$^($SQRT$(2)))+($BD6$^$PI$( ))+1), 10))

7F: In cell B7 enter the following formula:

=TRUNC(MOD((($BD6$^($SQRT$(2)))+($A7$^$PI$( ))+1), 10))

7G: Copy cells A7 and B7 to cells A8 and B8 through A11 and B11.

7H: Copy from cells A6 through BD11 to cells A13 to A20, down to cell A69.

7I: In cell B13, enter the formula=b6+1, and then copy cell B13 to cell B20 and every seventh cell down to cell B69.

7J: Save as the file with a suitable name, such as GFSRirr0.xls.

7K: Change the value in cell D3 to 1 and save the generator with a name such as GFSRirr1.xls, and repeat this step, changing the value in cell 13 from 2 to 9 and saving as the correspondingly named file.

8. Simple Fibonacci: The Simple Fibonacci generator also requires two seeds.

8A: Open the template from Step 2 and enter the label "Simple Fibonacci" in cells A2, A5, A12, A19 and in column A of every seventh row, down to cell A68. In cell A3 enter the label "Seeds" and in cell D3 enter the value 0. In cell. E3 enter "& 0 to 9".

8B: In cell A6 enter the formula =$d$3 and in cell B6 enter the value 0.

8C: Enter the following formula in cell C2:

=MOD(($B6$+$A6$), 10)

This formula adds the two preceding cells and calculates a modulo(1000) result.

8D: Copy the formula from cell C2 through cell BD6.

8E: Copy from cells C6 through BD6 down to cells C11 to BD11.

8F: In cell A7, enter the formula:

=MOD(($BD6$+$BC6$), 10)

8G: In cell B7 enter the following formula

=MOD(($A7$+$BD6$),10)

8H: Copy cells A7 and B7 through cells A11 and B11.

8I: Copy from cell A6 through BD11 to cells A13, to A20 and down to cell A69.

8J: In cell B13, enter the formula =b6+1, and then copy cell B13 to cell B20 and every seventh cell, down to cell B69.

8K: Save as the file with an appropriate name, such as SFib0.xls.

8L: Change the value in cell D3 to 1, save the generator with a name such as SFib1.xls, and repeat the procedure, changing the value in cell I3 from 2 to 9 and saving as a correspondingly named file.

To validate the data found in testing the generators in modulo(10), all of the generators were also tested to in modulo(1000), using a similar approach as described above for the modulo(10) case.

From the foregoing, it can be seen that the present invention provides a random number generator that produces sequences of numbers having a greater degree of randomness, and therefore higher reliability, than known generators of the types described previously. The decreased likelihood of repetition within each sequence is achieved by employing an irrational number as a factor in the algorithm that is used to generate the random values.

To illustrate the principles upon which the invention is based, it has been described with specific examples in modulo (10) and modulo(1000). It will be appreciated, however, that the present invention can be embodied in other forms without departing from the spirit or essential characteristics thereof. For instance, any number within an existing sequence can be employed as the index to the table of irrational numbers. Likewise, the product that is derived from the selected irrational number can be combined with any one or more numbers from the sequence in any of a variety of algebraic combinations. The presently disclosed embodiments are therefore considered in all respects to be illustrative, and not restrictive. The scope of the invention is indicated by the appended claims, rather than the foregoing description, and all changes that come within the meaning and range of equivalence thereof are intended to be embraced therein.

What is claimed is:

1. A system for generating a sequence of random numbers, comprising: a memory storing an indexed list of irrational values and a sequence of numbers; a processor that retrieves an irrational value from said list on the basis of a selected number in said stored sequence, and derives an integer value from the retrieved value; an adder that computes an algebraic sum of said integer value and at least one number in said stored sequence, and stores said sum as the next number in said sequence.

2. The system of claim 1, wherein said integer value is derived by multiplying the retrieved irrational value with a number in said sequence.

3. The system of claim 2, wherein the number that is multiplied with the retrieved irrational value is the most recent number in said sequence.

4. The system of claim 1, wherein the selected number is the most recent number in said sequence.

5. The system of claim 1, wherein said integer value is algebraically summed with plural numbers in said sequence.

6. The system of claim 5, wherein the absolute value of said algebraic sum is stored as the next number in said sequence.

7. The system of claim 5, wherein said integer value is algebraically summed with at least three numbers in said sequence.

8. The system of claim 1 wherein said algebraic sum is generated modulo n.

9. The system of claim 8, wherein said list contains n values.

\* \* \* \* \*